US011586649B2

(12) United States Patent
Seelemann, II et al.

(10) Patent No.: US 11,586,649 B2
(45) Date of Patent: Feb. 21, 2023

(54) DECLARATIVE CONFIGURATION FOR DATABASE REPLICATION

(71) Applicant: International Business Machines Corporation, Armonk, NY (US)

(72) Inventors: Dirk Alexander Seelemann, II, Ontario (CA); Michael Jory, North York (CA); Dzmitry Lepniakou, Toronto (CA); Mohammad Wasif Khan, Toronto (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 280 days.

(21) Appl. No.: 16/854,548

(22) Filed: Apr. 21, 2020

(65) Prior Publication Data
US 2021/0326358 A1     Oct. 21, 2021

(51) Int. Cl.
    *G06F 16/00*         (2019.01)
    *G06F 16/27*         (2019.01)
    *G06F 16/2453*     (2019.01)

(52) U.S. Cl.
    CPC ...... *G06F 16/273* (2019.01); *G06F 16/24542* (2019.01)

(58) Field of Classification Search
    CPC .............. G06F 16/273; G06F 16/24542; G06F 16/2315
    USPC ....................................................... 707/613
    See application file for complete search history.

(56) References Cited

U.S. PATENT DOCUMENTS

| 7,499,413 | B2 * | 3/2009 | Parham ................... H04L 45/14 |
| | | | 709/241 |
| 7,970,746 | B2 | 6/2011 | Seshadri et al. |
| 9,449,033 | B2 | 9/2016 | Kache et al. |
| 10,423,588 | B2 | 9/2019 | Akyureklier et al. |
| 2018/0260125 | A1 * | 9/2018 | Botes ................... G06F 11/1662 |
| 2018/0351806 | A1 | 12/2018 | Mohanram et al. |
| 2021/0165767 | A1 * | 6/2021 | D'Halluin ........... G06F 16/2322 |
| 2021/0168074 | A1 * | 6/2021 | Bao ......................... H04L 45/42 |
| 2021/0256515 | A1 * | 8/2021 | Gale .................... G06Q 20/3827 |

* cited by examiner

*Primary Examiner* — Chelcie L Daye
(74) *Attorney, Agent, or Firm* — Garg Law Firm, PLLC; Rakesh Garg; Rakesh Roy

(57) ABSTRACT

An embodiment generates, responsive to receiving a declarative replication specification, a logical map comprising a plurality of paths to completing a data replication process identified by the replication specification. The embodiment determines, responsive to generating the logical map, an optimal path to completing the data replication process by searching the plurality of paths of the logical map using a cost-directed search algorithm to find the optimal path from among the plurality of paths. The embodiment also performs, responsive to finding the optimal path, a series of data replication operations for replicating source data on a target database. The embodiment also detects, during a runtime of the data replication process, a predetermined change to a runtime environment of the data replication process. The embodiment also determines, responsive to detecting the predetermined change, a revised optimal path for performing the data replication process in the changed runtime environment.

20 Claims, 6 Drawing Sheets

DECLARATIVE CONFIGURATION FOR DATABASE REPLICATION

BACKGROUND

The present invention relates generally to a method, system, and computer program product for database replication. More particularly, the present invention relates to a method, system, and computer program product for declarative configuration for database replication.

A "database management system" (DBMS) is a type of software application designed for administering databases, which generally includes creating, querying, and updating databases. There are many different DBMS applications available, and while most are compatible with a wide range of databases, the DBMS applications differ somewhat from each other.

One significant difference between different DBMS applications involves variations in support and implementation of data types. When a DBMS creates a table or adds a field to a table in a database, fields are created as specific data types. DBMS applications use data types as classifications that identify possible values for and operations that can be done on the data, as well as the way the DBMS stores data in that field in the database. Because of these variations in data types, it is a non-trivial task to copy data from one type of DBMS to another.

Database replication (or data replication) involves the heterogeneous copying of data between disparate kinds DBMS applications. Database replication can include copying many common database objects, such as tables, indices, triggers, views, and functions. Data replication can also involve making a complete copy or a less than complete copy of data in a database. For example, a complete replica can provide for improved availability in case of a failure, and can provide improved response times when server load is shared among the original and replica databases. A partial replica can allow for geographically distributed replicas that are locally customized according to local configurations.

SUMMARY

The illustrative embodiments provide for declarative configuration for database replication. An embodiment includes generating, responsive to receiving a declarative replication specification, a logical map comprising a plurality of paths to completing a data replication process identified by the replication specification. The embodiment also includes determining, responsive to generating the logical map, an optimal path to completing the data replication process by searching the plurality of paths of the logical map using a cost-directed search algorithm to find the optimal path from among the plurality of paths. The embodiment also includes performing, responsive to finding the optimal path, a series of data replication operations for replicating source data on a target database. The embodiment also includes detecting, during a runtime of the data replication process, a predetermined change to a runtime environment of the data replication process. The embodiment also includes determining, responsive to detecting the predetermined change, a revised optimal path for performing the data replication process in the changed runtime environment. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
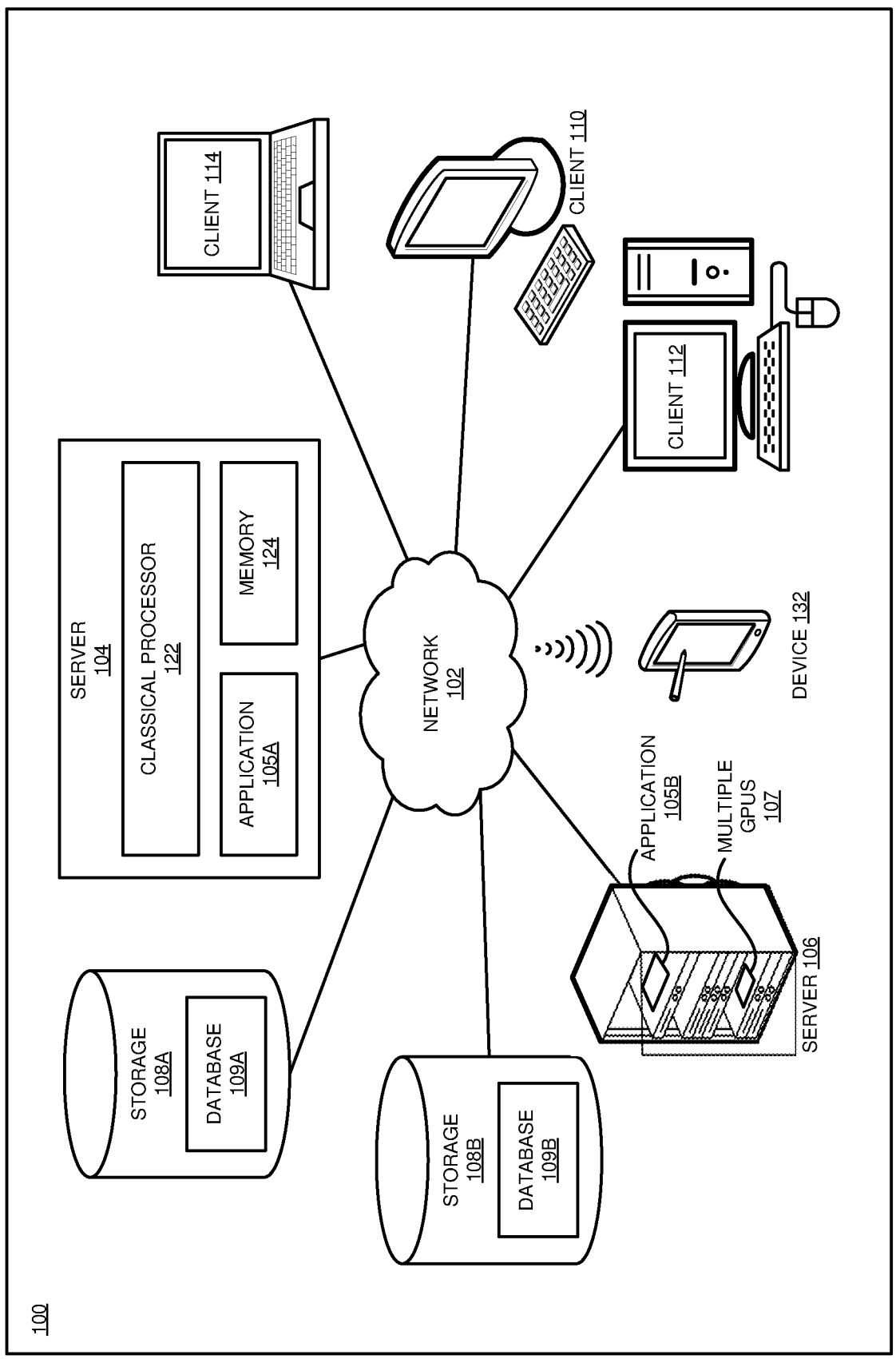
FIG. 1 depicts a block diagram of a network of data processing systems in which illustrative embodiments may be implemented.

In fields related to database technology, the demand for data replication arises in scenarios that involve data that has to be available in geographically distant locations or where database performance and availability improvements are desired. In the past, the lack of network bandwidth and high cost of improving bandwidth provided motivation for database replication in geographically distant locations to allow the data to be closer to globally distributed users. More recently, as global networking has improved, the bottleneck for database performance has moved closer to the databases, DBMSs and operating systems. However, replication continues to become increasingly desirable. For example, data replication allows for load sharing with replicas, which can provide gains in performance, response times, and throughput.

Modern DBMS applications are highly configurable and adaptable to multiple replication scenarios. Examples of scenarios include creating replicas for load sharing; replicating data in near real time to a data store used to extract analytic database information; performing near real time auditing of a database; and copying data to a heterogeneous environment where the data is from various databases running on different hardware and operating systems. For example, one scenario involves heterogeneous copying of data between disparate kinds of systems.

However, prior replication systems require considerable time and effort to set up and configure correctly. Prior replication systems require "manual" configuration, meaning a detailed type of configuration also known as "imperative" configuration. A system that requires a user to provide an imperative configuration will require the user to specify what task the user wants the system to do, and also specify how the user wants the system to accomplish the task. For example, an imperative configuration may include a "what" part of the configuration, such as "move this block of data from node A to node B" as the task, and then also include the "how" part of the configuration, such as "begin with this byte at node A and move it to this address at node B, then continue with this other byte at node A and move it to this address at node B," and so on.

Embodiments disclosed herein introduce declarative configuration for data replication in place of the imperative configurations that are required by prior data replication applications. In contrast to imperative configuration that required both the "what" and "how" configuration inputs, a declarative configuration only includes the "what" part of the configuration inputs, and omits the "how" part of the configuration input. In other words, declarative configuration focuses on what the program should accomplish without specifying how the program should achieve the result. As a result, embodiments disclosed herein include data replication applications that receive intention-based declarative configuration inputs, meaning that the user provides one or more objectives, and the replication application uses an optimization algorithm to determine how to achieve the one or more objectives rather than requiring the user to input instructions for how the objectives should be achieved.

Thus, disclosed embodiments recognize that the extent and technical nature of prior configuration requirements for data replication applications made it difficult to complete and left it prone to human error. Also, because there are vast possible configurations that can be implemented for any given replication process, it is well beyond human capabilities to consider every possible option and determine a most optimal configuration. As a result, there typically will be considerable potential for further optimizing manually-configured replication processes.

The disclosed embodiments recognize that many technical improvements to data replication systems, processes, and supporting network infrastructure can be realized by implementing improvements disclosed herein. For example, embodiments disclosed herein include automated configuration of replication processes that include optimization techniques for determining an optimal path for transmitting data between source and target servers.

The illustrative embodiments include receiving a replication request and an associated replication specification. The replication specification is an intention-based, declarative configuration description in which a user describes overall goals and objectives for the requested replication. The replication system then handles configuration of the replication based on the declarative input from the user. Thus, embodiments disclosed herein relieve users of the burden of complex configurations, and instead allows a user to simply submit goals, for example in the form of free-form text and/or populated form fields. The replication system receives those goals and determines how to achieve those goals. For example, in some embodiments, a user inputs a declarative instruction that includes an identification of the desired source and target data tables, a timeline or deadline, and/or an indication of database types.

Thus, in some embodiments, the replication includes type conversions according to differences between the database types of the source and target tables. Also, unlike systems that simply make a bit by bit copy of some block of data, some embodiments disclosed herein replicate a live database by monitoring a log for committed transactions that change the source table, converting the transaction into a message, putting the message on a send queue to a target server, and then applying the transactions to the target table.

In some embodiments, a replication application receives a replication specification from a user. In some embodiments, the replication application parses the specification to derive configuration assets. In some embodiments, the configuration assets derived from the specification include, for example, secrets, connections, staging areas, and replication type. In some embodiments, the secrets include authentication tokens or the like that allow for encryption and/or other efforts to limit access to the data being replicated. In some embodiments, the secrets simply include one or more passwords to allow access to data, servers, or other assets. In some embodiments, the connections are information related to descriptions of the routes used to move data between the source and target tables. In some embodiments, staging areas provide temporary data storage to allow for data operations, such as conversions or other operations performed as part of the replication process.

In some embodiments, the replication application builds a logical map based on the received replication specification that includes a plurality of paths that represent respective options for where and how the replicated data will flow between the source and target servers. In some embodiments, the replication application then uses an optimization algorithm to find an optimal path from among the plurality of paths of the logical map. For example, in some such embodiments, the replication application includes an automated process or automaton that recognizes predefined functional descriptions available for use by users to explain how the users want to replicate their data. In some embodiments, the automated process will convert the user's data in accordance with the user's input regarding the user's intent (e.g., "I want to concatenate this string and this number and store it in this location").

In some embodiments, the replication involves disparate source and target systems. In such cases, the logical map includes an additional plurality of paths that represent respective options for where and how data types will be converted to be compatible with the target database in order to preserve the semantic meaning of the data. In some embodiments, the replication involves data tables that are structurally different from each other that require data transformations as part of the replication process. For example, in some embodiments, a target data table may have fields that are bigger or smaller than the corresponding source fields, columns that combine or split data from the source, fields that require formats that differ from the corresponding source fields (e.g., different date or time formats), or columns that are derived from one or more source columns. In some embodiments, the user's intent includes source and target type definitions for the data. In some such embodiments, each type of data is associated with a meta-structure referred to herein as an "Extent." Extents introduce a new declarative system based on common ur-types (things that repeat, things that contain things, things we can do arithmetic on, things we can read) that includes encoding for the structural information of the data and how to retrieve it. In some embodiments, each Extent is a meta-type system that lacks canonical structure, but has an Extent class that defines a single accessor that allows the automated process to discover the full fidelity of the data value. Thus, in some embodiments, an automated process uses Extents to work on common and unusual data in full fidelity.

In some embodiments, the replication application routes data between source and target servers that are located at great distances from each other, for example in different parts of the country, in different countries, or on different continents. Also, in some embodiments, it may be desirable to move data in steps using a store-and-forward technique so that if the network gets congested and packets are dropped, the replication application can resend the lost packets from a location that is closer to the destination rather than resend the entire route. However, if it costs too much to store the data in route, then the replication application may determine that a more optimal path sends the data directly to the target server. For example, if the amount of data being transmitted to the target server is relatively large, such as on the order of hundreds of gigabytes or terabytes or more, it may be cost prohibitive to store data in route, for example as may be done using a store-and-forward technique.

Even for such large distances and amounts of data, there are typically many possible paths between the source and target servers that are subject to different time and monetary costs. As a non-limiting example, in an embodiment a source server may be located in Dallas and a target database may be in Tokyo. Possible paths may involve sending the data from Dallas to Frankfurt, then from Frankfurt to Hong Kong, and finally from Hong Kong to Tokyo, with or without temporarily storing the data at one or more of the servers along the way. Other possible paths may be to send the data from Dallas to Hong Kong and then to Tokyo, with or without temporarily storing the data at one or more of the servers along the way. In this simplified example, the replication application calculates the time and monetary costs of sending the data along these and other possible routes. In some embodiments, the replication application uses historical data, network analysis, and/or new or existing agreements with network and/or data storage providers to calculate time and monetary costs involved with different path options. In some embodiments, the costs vary depending on the day or time at which the data is moved or stored. In such embodiments, the replication application will consider deadline information provided by the user to determine costs along different paths at different days or times. The result will be an automated determination of an optimal path or paths that account for user-provided constraints.

In some embodiments, a cost metric is used by the replication application based on a user-specified metric or a metric that the replication application infers from the replication specification. For example, in some embodiments, monetary cost may be much less of a concern than time cost where moving data quickly is a high priority. On the other hand, in some embodiments, the lowest possible dollar cost is a priority while timing is a much lower priority, e.g., a one-week period to transfer data is okay if there is a monetary savings involved.

In some embodiments, the replication application uses a cost-directed search method to find an optimal path through the logical map. For example, in some embodiments the replication application uses a known search algorithm, for example an A-star (or "A*") search algorithm, a known best-first search algorithm, or a known branch-and-bound search algorithm to find an optimal path.

For example, an A-star is a standard heuristic searching algorithm that has been used quite extensively in route planning and graph searching algorithms. An A-star is a best-first search heuristic that computes a cost function for various locations in an environment. A-star explores the search space by computing a cost function for each possible next position to search, and then selects the lowest-cost position to add to the path. The addition of this new location to the search space is then used to generate more path possibilities. All paths in the search space are explicitly represented using pointers from each position back to the previous position from which that position was derived. The cost function that is minimized at each step of the A-star propagation is shown below as Equation 1.

$$f(x)=ag(x)+bh(x) \qquad \text{Equation 1}$$

In Equation 1, $g(x)$ can be any function which expresses the actual cost from the start position to the intermediate position x. The value $h(x)$ similarly can be any function which expresses the estimated cost from position x to the desired goal position. The values a and b are parameters used to add weight to the actual and estimated costs and are usually set to 1. At each step in the A-star propagation, the lowest $f(x)$ value is selected and inserted into a sorted list of possible paths. It has been proven that if the actual cost from x to the goal is greater than or equal to the estimate, $h(x)$, of this cost, then the solution produced by A-star is guaranteed to be a minimum-cost solution. Essentially, while the A-star technique employs a search technique of summing the cost to reach an intermediate point with an estimate of the cost to reach the goal from that intermediate point and evaluating all points and all angles from which the point may be reached. The optimization algorithm outputs the best path in a form that is converted into a series of replication specifications for execution by an execution program generator to perform the replication process.

In some embodiments, the replication application performs a goal evaluation at regular intervals to determine whether there has been a change to the network. If such a change is detected, the evaluation probes the environment to determine whether the chosen path remains optimal. If, for example, a new and better network path became available, the replication application would eventually detect it and start flowing data along that path without a user intervention.

Thus, embodiments provide improved computer processing in terms of network routing and the data flows through the network routing using the map-based optimizations disclosed herein. In addition, over time the replication application algorithm will continue to improve and implement additional optimizations, such as removing unnecessary work, for example by recognizing that if a field is unused, the application can stop or skip processing the field, and automatically exclude it from further processing. Also, the replication process results in a copy of the data being provided to an additional location, which means that users near the new location can run separate queries more efficiently. Alternatively, queries can then be run on multiple copies of the database, which results in an increased query capacity.

In some embodiments, the replication application receives a replication specification that involves a target server location and data set. In some embodiments, the replication application checks for previous and existing data flows that can be leveraged for the new replication request. For example, if the data has already been moved or is being moved, the replication application determines whether there is a copy of the data closer to the specified target that can be used instead of the data from the source. In some embodiments, if there is an existing data flow, the replication application can synchronize the new and previously-existing data streams. In some such embodiments, the replication application can use a common stream to change the data in more than one place.

In some embodiments, the replication application includes a user interface. In some such embodiments, the user interface includes a graphical user interface (GUI), a command line interface, and/or a replication dashboard. In some embodiments, the interface allows a user to submit various user inputs to the data replication application, including replication requests and intention-based, declarative replication specifications. In some embodiments, the interface includes form input elements that a user can populate with data that will be submitted as form data to submit replication requests and intention-based, declarative replication specifications. In some embodiments, although the user has submitted an intention-based, declarative replication specification that has been processed by the replication application, the user may wish to manually adjust some configuration parameters to override the automated configuration generated by the replication application. The interface allows a user to optionally set or adjust configuration parameters for configuration of a source database and a target database associated with the replication request or for configuration of the replication request itself. In some embodiments, the interface allows a user to create the target database. In some embodiments, the interface generates display data for displaying information on a display device, including any of the information described herein, including display of a GUI, command line, and/or dashboard.

In some embodiments, the interface allows a user to monitor the data replication process and receive various reports while the replication process is ongoing and/or upon completion of the replication process. In some embodiments, the interface includes a browser-based front end that displays status, alert, and performance information for the replication process. For example, in some embodiments, the interface provides a graphical display of a summary overview that indicates all send and receive queues that are active. In some embodiments, the interface monitors the progress of the replication process and updates the information shown on the graphical display in real time or near real time.

In some embodiments, a data replication application generates one or more connections that are used to replicate data between the source database and the target database. For example, in some embodiments, the connections contain details of respective transactions (e.g., a set of tables and their columns along with other change data capture (CDC) properties such as filter/user exit, expressions, etc.) that are being replicated and details of how the source data is applied to the target database. In some such embodiments, the replication dashboard provides a graphical display of information regarding status, alert situations, performance indicators for existing and/or active connections.

In some embodiments, the source database interface communicates with source data storage. In some embodiments, the source database interface locates source data in the source database for replication according to the replication request. For example, in some embodiments, the replication request designates some or all of the data of the source database as source data to be replicated.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or component that are not shown or described herein, or structures or components different from those shown but for a similar function as described herein may be present without departing the scope of the illustrative embodiments.

Furthermore, the illustrative embodiments are described with respect to specific actual or hypothetical components only as examples. The steps described by the various illustrative embodiments can be adapted for providing explanations for decisions made by a machine-learning classifier model, for example.

Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, contrastive explanations, computer readable storage medium, high-level features, historical data, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
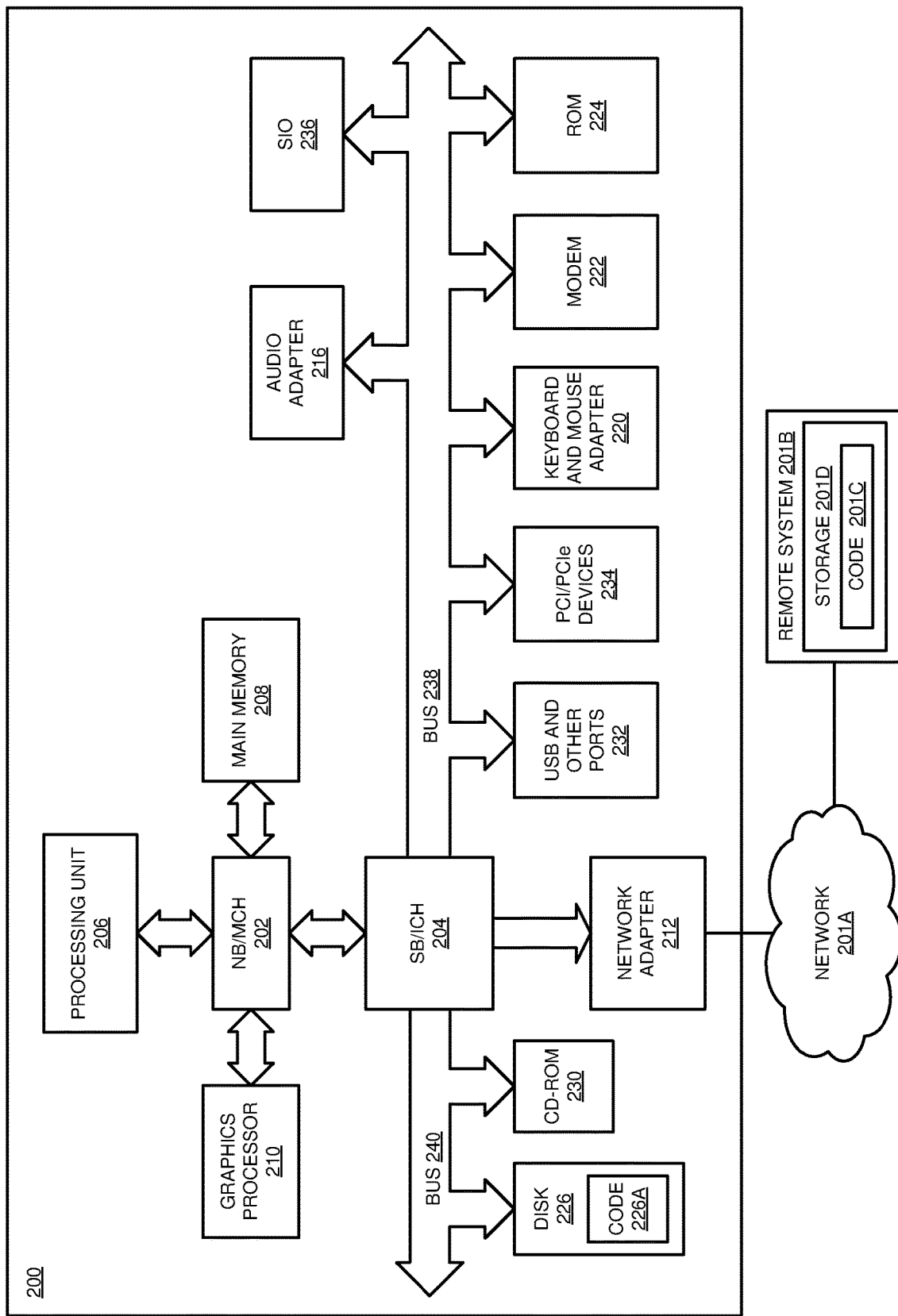
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Data processing system 104 couples to network 102. Software applications may execute on any data processing system in data processing environment 100. Any software application described as executing in processing system 104 in FIG. 1 can be configured to execute in another data processing system in a similar manner. Any data or information stored or produced in data processing system 104 in FIG. 1 can be configured to be stored or produced in another data processing system in a similar manner. A data processing system, such as data processing system 104, may contain data and may have software applications or software tools executing computing processes thereon. In an embodiment, data processing system 104 includes memory 124, which includes application 105A that may be configured to implement one or more of the data processor functions described herein in accordance with one or more embodiments.

Server 106 couples to network 102 along with storage unit 108B. Storage unit 108B includes a database 109B configured to store data as described herein with respect to various embodiments, for example image data and attribute data. Server 106 is a data processing system. In an embodiment, server 106 includes an application 105B that may be configured to implement one or more of the processor functions described herein in accordance with one or more embodiments.

Clients 110, 112, and 114 are also coupled to network 102. A conventional data processing system, such as server 106, or client 110, 112, or 114 may contain data and may have software applications or software tools executing conventional computing processes thereon.

Only as an example, and without implying any limitation to such architecture, FIG. 1 depicts certain components that are usable in an example implementation of an embodiment. For example, server 106, and clients 110, 112, 114, are depicted as servers and clients only as example and not to imply a limitation to a client-server architecture. As another example, an embodiment can be distributed across several data processing systems, and a data network as shown, whereas another embodiment can be implemented on a single data processing system within the scope of the illustrative embodiments. Conventional data processing systems 106, 110, 112, and 114 also represent example nodes in a cluster, partitions, and other configurations suitable for implementing an embodiment.

Device 132 is an example of a conventional computing device described herein. For example, device 132 can take the form of a smartphone, a tablet computer, a laptop computer, client 110 in a stationary or a portable form, a wearable computing device, or any other suitable device. In an embodiment, device 132 sends requests to server 106 to perform one or more data processing tasks by application 105B such as initiating processes described herein. Any software application described as executing in another conventional data processing system in FIG. 1 can be configured to execute in device 132 in a similar manner. Any data or information stored or produced in another conventional data processing system in FIG. 1 can be configured to be stored or produced in device 132 in a similar manner.

Server 106, storage unit 108B, data processing system 104, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 106 may provide data, such as boot files, operating system images, and applications to clients 110, 112, and 114. Clients 110, 112, and 114 may be clients to server 106 in this example. Clients 110, 112, 114, or some combination thereof, may include their own data, boot files, operating system images, and applications. Data processing environment 100 may include additional servers, clients, and other devices that are not shown.

In the depicted example, memory 124 may provide data, such as boot files, operating system images, and applications to processor 122. Processor 122 may include its own data, boot files, operating system images, and applications. Data processing environment 100 may include additional memories, processors, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a conventional client data processing system and a conventional server data processing system. Data processing environment 100 may also employ a service-oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a conventional computer, such as data processing system 104, server 106, or clients 110, 112, and 114 in FIG. 1, or another type of device in which computer usable program code or instructions implementing the processes may be located for the illustrative embodiments.

Data processing system 200 is also representative of a conventional data processing system or a configuration therein, such as conventional data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid-state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105A, 105B in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer-implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. In another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
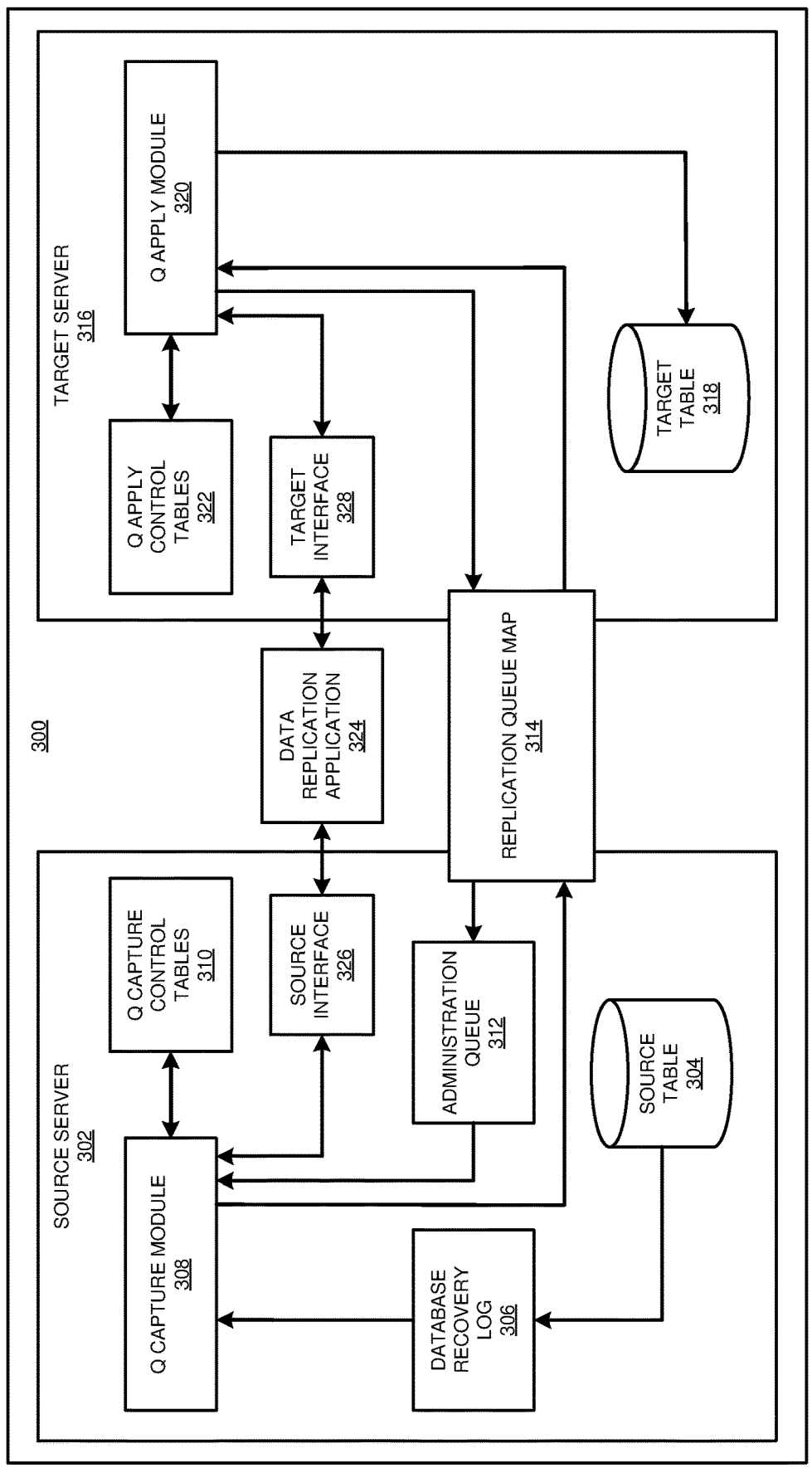
FIG. 3 depicts a block diagram of an example configuration for performing a data replication process in accordance with an illustrative embodiment.

With reference to FIG. 3, this figure depicts a block diagram of an example configuration 300 in accordance with an illustrative embodiment. In a particular embodiment, the configuration 300 includes a source server 302 and a target server 316, which are examples of servers 104 and 106 of FIG. 1.

In the illustrated embodiment, the source server 302 includes a source table 304, a database recovery log 306, a Q capture module 308, one or more Q capture control tables 310, and an administration queue 312. The illustrated embodiment also includes a replication queue map 314 that maps the source server 302 to the target server 316. The target server 316 includes a target table 318, a Q apply module 320, and one or more Q apply control tables 322. The illustrated embodiment also includes a data replication application 324 that is in communication with the source server 302 via a source interface 326 and is in communication with the target server 316 via a target interface 328. In some embodiments, the functionality described herein is distributed among a plurality of systems, which can include combinations of software and/or hardware based systems, for example Application-Specific Integrated Circuits (ASICs), computer programs, or smart phone applications. In some embodiments, the servers 302, 316 operate in a cloud environment, where the source table 304 and the target table 318 are stored in respective clusters of a cloud storage system.

In some embodiments, a replication process is initiated and managed by the data replication application 324, which can operate as discussed in connection with FIG. 4. In some embodiments, the replication process captures changes to the source table 304 and converts committed transactional data to messages that are sent to the target server 316. In some embodiments, data is sent to the target server as soon as the replication process detects that the data has been committed at the source table 304 rather than being staged in tables.

More specifically, in some embodiments, the Q capture module 308 reads the database recovery log 306 for changed source data in the source table 304 and writes the changes to the replication queue map 314, which converts that data into messages and sends the messages to the target server 316. In some embodiments, the Q capture module 308 reads database recovery log 306 sequentially for committed changes to the source table 304. If the Q Capture program reads a committed change to the source table 304, it adds the change to the replication queue map 314. Transactions in the replication queue map 314 are therefore potentially subsets of the corresponding transactions in the database recovery log 306 because they contain only changes to the source table. As an example, when the Q capture module 308 reads a COMMIT statement for a transaction, it converts the transaction into a message and puts the message on a send queue in the replication queue map 314. The target server 316 then applies the transactions to the target table 318.

In some embodiments, the replication queue map 314 is a messaging middleware that uses messages and queues to support exchange of information between the source and target servers 302, 316. In some embodiments, the replication queue map 314 supports one or more communication protocols or APIs, for example Representational state transfer (REST), .NET, MQ Light, and MQTT.

In some embodiments, the Q capture module 308 uses a set of control tables 310, for example DB2® relational tables used as Q Capture control tables 310 (DB2 is a registered trademark of International Business Machines Corp.). In some embodiments, the Q Capture control tables 310 contain information about replication sources, the targets that correspond to them, and queues of the queue map 314 that are being used by the Q capture module 308. In some embodiments, the Q Capture control tables 310 also contain data that is used to check and monitor the performance of Q capture module 308, such as data about the current position of the Q capture module 308 in the recovery log 306.

In some embodiments, the Q apply module 320 uses a set of control tables 322, for example Q apply control tables 322. In some embodiments, the Q apply control tables 322 contain information about replication targets, the sources that correspond to them, and queues of the queue map 314 that are being used by the Q apply module 320. In some embodiments, the Q apply control tables 322 also contain data that is used to check and monitor the performance of Q apply module 320.

In some embodiments, the source and target tables 304, 318 include the same or different relational database management systems (RDBMSs). For example, in some embodiments, the source includes a Db2 or Oracle RDBMS, and the target includes an Oracle, Informix®, Microsoft SQL Server, Sybase, or Teradata.

Figure 4:
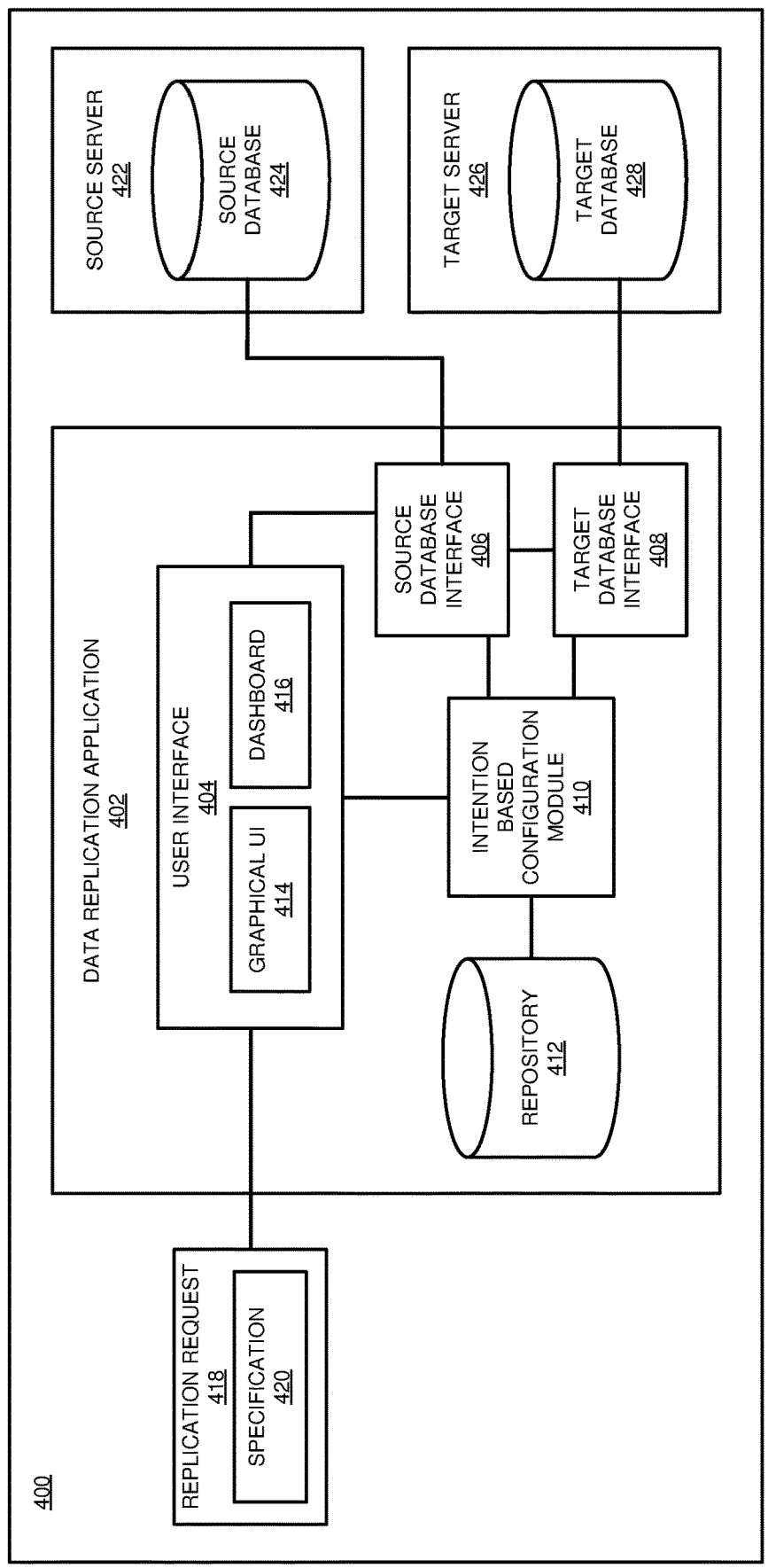
FIG. 4 depicts block diagram of an example configuration of a data replication application in accordance with an illustrative embodiment.

With reference to FIG. 4, this figure depicts a block diagram of an example configuration 400 in accordance with an illustrative embodiment. In a particular embodiment, the configuration 400 includes a data replication application 402, which is an example of the data replication application 324 in FIG. 3. The data replication application 402 is in communication with a source server 422 and a target server 426, which are examples of the source and target servers 302, 316, respectively, in FIG. 3.

In the illustrated embodiment, the data replication application 402 includes a user interface 404, a source database interface 406, a target database interface 408, an intention-based configuration module 410 and a repository 412. In some embodiments, the functionality described herein is distributed among a plurality of systems, which can include combinations of software and/or hardware based systems, for example Application-Specific Integrated Circuits (ASICs), computer programs, or smart phone applications.

In some embodiments, the user interface 404 includes a graphical user interface (GUI) 414 and a replication dashboard 416. The GUI 414 allows a user to submit a replication request 418 to the data replication application 402. In the illustrated embodiment, the GUI 414 also allows the user to include a replication specification 420 to the data replication application 402. In some embodiments, the GUI 414 includes form input elements that a user can populate with data that will be submitted as form data to submit replication request 418 and/or specification 420. In some embodiments, the GUI 414 allows a user to set or modify configuration parameters for configuration to supplement or modify automated configuration settings set by the replication application 402. In some embodiments, the GUI 414 allows a user to create the target database 428. In alternative embodiments, the user interface 404 includes a command line interface in place of, or in addition to, the GUI 414 with some or all of the functionality described in connection with the GUI 414.

The replication dashboard 416 allows a user to monitor the data replication process and receive various reports while the replication process is ongoing and/or upon completion of the replication process. In some embodiments, the replication dashboard 416 is a browser-based front end that displays status, alert, and performance information for the replication process. For example, in some embodiments, the replication dashboard 416 provides a graphical display of a summary overview that indicates all send and receive queues that are active. In some embodiments, the replication dashboard 416 monitors the progress of the replication process and updates the information shown on the graphical display in real time or near real time.

In some embodiments, the user interface 404 provides the data from the specification 420 to the intention-based configuration module 410. In some embodiments, the intention-based configuration module 410 receives the replication request 418 and the associated replication specification 420. The replication specification 420 is an intention-based, declarative configuration description in which a user describes overall goals and objectives for the requested replication 418. The intention-based configuration module 410 then handles configuration of the replication 418 based on the declarative input from the user and data retrieved from the repository 412. Thus, embodiments disclosed herein relieve users of the burden of complex configurations, and instead allows a user to simply submit goals, for example in the form of free-form text and/or populated form fields. The intention-based configuration module 410 receives those goals and determines how to achieve those goals. For example, in some embodiments, a user inputs a declarative instruction that includes an identification of the desired source and target data tables, a timeline or deadline, and/or an indication of database types.

Thus, in some embodiments, the intention-based configuration module 410 includes type conversions according to differences between the database types of the source and target databases 424, 428. Also, unlike systems that simply make a bit by bit copy of some block of data, some embodiments disclosed herein replicate a live database by monitoring a log for committed transactions that change the source database 424, converting the transaction into a message, putting the message on a send queue to a target server 426, and then applying the transactions to the target table.

The intention-based configuration module 410 generates one or more connections that are used to replicate data between the source database 424 and the target database 428. For example, in some embodiments, the connections contain details of respective transactions (e.g., a set of tables and their columns along with other change data capture (CDC) properties such as filter/user exit, expressions, etc.) that are being replicated and details of how the source data is applied to the target database 428. In some such embodiments, the replication dashboard 416 provides a graphical display of information regarding status, alert situations, performance indicators for existing and/or active connections.

In some embodiments, the source database interface 406 communicates with source database 424 and the target database interface 408 communicates with target database 428. In some embodiments, the source database interface 406 locates source data in the source database 424 for replication according to instructions from the intention-based configuration module 410. In some embodiments, the target database interface 408 notifies the target database 428 to receive data from the source database 424 and replicate the structure and other aspects of the source database 424 according to instructions from the intention-based configuration module 410. For example, in some embodiments, the replication request 418 designates some or all of the data of the source database as source data to be replicated.

Figure 5:
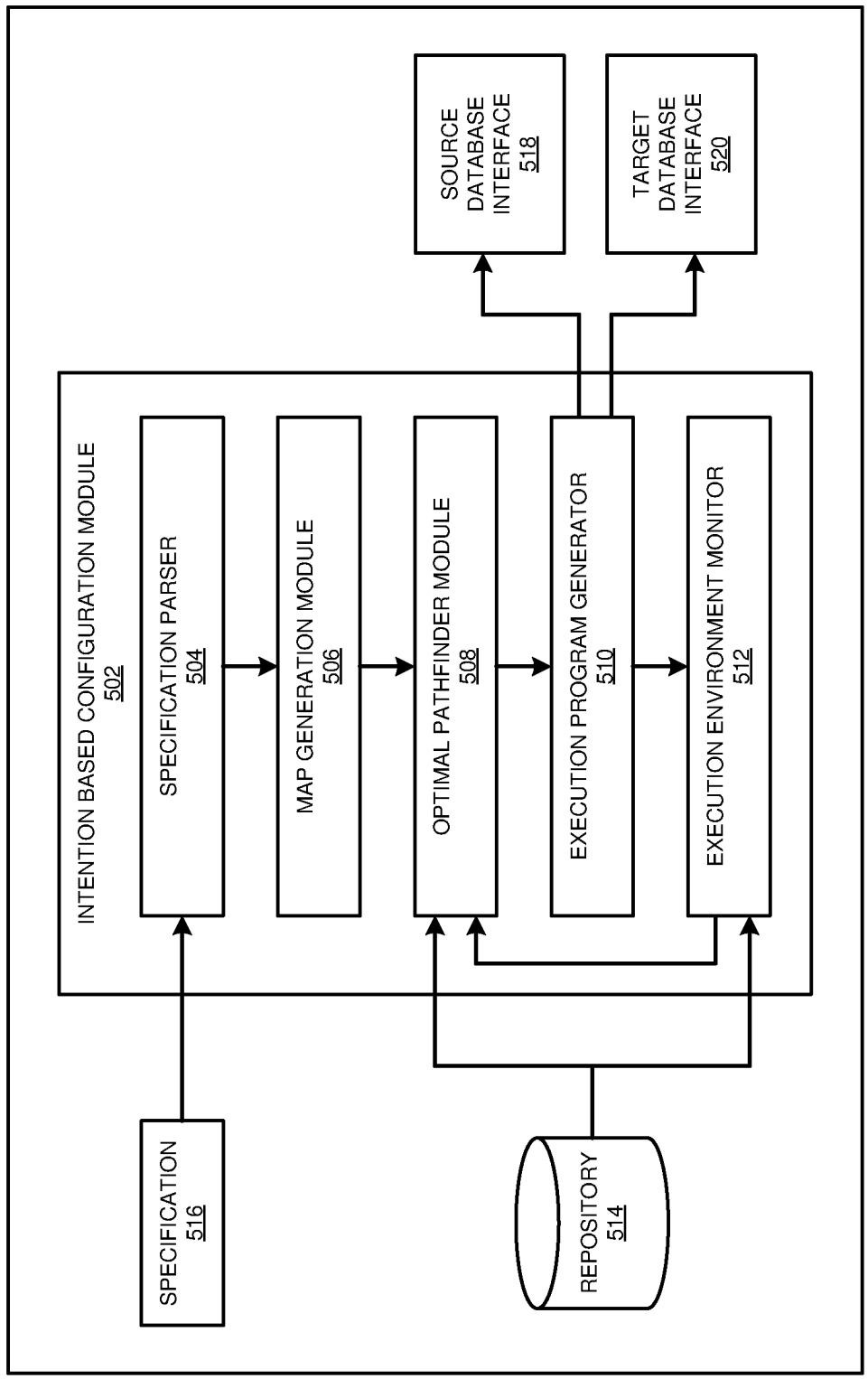
FIG. 5 depicts a block diagram of an example intention-based configuration module in accordance with an illustrative embodiment.

With reference to FIG. 5, this figure depicts a block diagram of an example intention-based configuration module 502 in accordance with an illustrative embodiment. In a particular embodiment, the intention-based configuration module 502 is an example of intention-based configuration module 410 of FIG. 4. The intention-based configuration module 502 is in communication with a repository 514, which is an example of repository 412 of FIG. 4. The intention-based configuration module 502 is also in communication with a source database interface 518 and a target database interface 520, which is are examples of source and target database interfaces 406, 408, respectively, of FIG. 4

In the illustrated embodiment, the intention-based configuration module 502 includes a specification parser 504, map generation module 506, an optimal pathfinder module 508, an execution program generator 510, and an execution environment monitor 512. In some embodiments, the functionality described herein is distributed among a plurality of systems, which can include combinations of software and/or hardware based systems, for example Application-Specific Integrated Circuits (ASICs), computer programs, or smart phone applications.

In some embodiments, the specification parser 504 receives a replication specification 516 associated with a replication request. The replication specification 516 is an intention-based, declarative configuration description in which a user describes overall goals and objectives for the requested replication. In some embodiments, the specification 516 includes one or more of a description of a customer environment, a desired end state of data at an origin, a desired structure and format of the data at a destination, existing data flows, environmental factors and data characteristics. The specification parser 504 parses the specification 516 to derive configuration assets. For example, in some embodiments, the specification parser 504 includes an automated process or automaton that recognizes predefined functional descriptions available for use by users to explain how the users want to replicate their data. In some embodiments, the automated process will convert the user's data in accordance with the specification 516 regarding the user's intent (e.g., "I want to concatenate this string and this number and store it in this location").

In some embodiments, the configuration assets derived from the specification 516 include, for example, secrets, connections, staging areas, and replication type. In some embodiments, the secrets include authentication tokens or the like that allow for encryption and/or other efforts to limit access to the data being replicated. In some embodiments, the secrets simply include one or more passwords to allow access to data, servers, or other assets. In some embodiments, the connections are information related to descriptions of the routes used to move data between the source and target tables. In some embodiments, staging areas provide temporary data storage to allow for data operations, such as conversions or other operations performed as part of the replication process.

In some embodiments, the map generation module 506 builds a logical map based on the received replication specification 516 that includes a plurality of paths that represent respective options for where and how the replicated data will flow between the source and target servers. In some embodiments, the replication involves disparate source and target systems. In such cases, the logical map includes an additional plurality of paths that represent respective options for where and how data types will be converted to be compatible with the target database in order to preserve the semantic meaning of the data. In some embodiments, the replication involves data tables that are structurally different from each other that require data transformations as part of the replication process. For example, in some embodiments, a target data table may have fields that are bigger or smaller than the corresponding source fields, columns that combine or split data from the source, fields that require formats that differ from the corresponding source fields (e.g., different date or time formats), or columns that are derived from one or more source columns. In some embodiments, the specification 516 includes source and target type definitions for the data. In some such embodiments, each type of data is associated with a meta-structure referred to herein as an "Extent." Extents introduce a new declarative system based on common ur-types (things that repeat, things that contain things, things we can do arithmetic on, things we can read) that includes encoding for the structural information of the data and how to retrieve it. In some embodiments, each Extent is a meta-type system that lacks canonical structure, but has an Extent class that defines a single accessor that allows the automated process to discover the full fidelity of the data value. Thus, in some embodiments, an automated process uses Extents to work on common and unusual data in full fidelity.

In some embodiments, the map generation module 506 generates paths that include routes for data between source and target servers that are located at great distances from each other, for example in different parts of the country, in different countries, or on different continents. Also, in some embodiments, the logical map generation module 506 generates paths that move data in steps using a store-and-forward technique so that if the network gets congested and packets are dropped, the replication application can resend the lost packets from a location that is closer to the destination rather than resend the entire route. In some embodiments, the map generation module 506 generates paths for moving the data directly from the source server to the target server.

There are typically many possible paths between source and target servers that are subject to different time and monetary costs. As a non-limiting example, in an embodiment a source server may be located in Dallas and a target database may be located in Tokyo. In this example, the map generation module 506 may generate paths for moving the data from Dallas to Frankfurt, then from Frankfurt to Hong Kong, and finally from Hong Kong to Tokyo, with or without temporarily storing the data at one or more of the servers along the way. In this example, the map generation module 506 may also generate paths for moving the data from Dallas to Hong Kong and then to Tokyo, with or without temporarily storing the data at one or more of the servers along the way.

In some embodiments, the map generation module 506 checks for previous and existing data flows that can be leveraged for the new replication request. For example, if the data has already been moved or is being moved, the map generation module 506 determines whether there is a copy of the data closer to the specified target that can be used instead of the data from the source. In some embodiments, if there is an existing data flow, the map generation module 506 includes a path that synchronizes the new and previously-existing data streams such that a common stream would be used for this path to change the data in more than one place.

In some embodiments, the optimal pathfinder module 508 uses an optimization algorithm to find an optimal path from among the plurality of paths of the map. For example, in some embodiments, the optimal pathfinder module 508 uses an A-star search optimization algorithm to determine an optimal path. In some embodiments, the optimal pathfinder module 508 calculates the time and monetary costs of sending the data along the possible paths. In some embodiments, the optimal pathfinder module 508 uses historical data, network analysis, and/or new or existing agreements with network and/or data storage providers from the repository 514 to calculate time and monetary costs involved with different path options. In some embodiments, the costs vary depending on the day or time at which the data is moved or stored. In such embodiments, the optimal pathfinder module 508 will consider deadline information provided by the user to determine costs along different paths at different days or times. The result will be an automated determination of an optimal path or paths that account for user-provided constraints.

In some embodiments, the optimal pathfinder module 508 selects a cost metric for determining a cost-optimized path based on a user-specified metric or based on a metric that the specification parser 504, map generation module 506, or optimal pathfinder module 508 infers or derives from the replication specification 516. For example, in some embodiments, monetary cost may be much less of a concern than time cost where moving data quickly is a high priority, so the optimal pathfinder module 508 uses time as a cost metric. On the other hand, in some embodiments, the lowest possible dollar cost is a high priority while timing is a much lower priority, e.g., a one-week period of time to transfer data is okay if there is a monetary savings involved, so the optimal pathfinder module 508 uses monetary cost as a cost metric. In some embodiments, the optimal pathfinder module 508 uses a combination of time cost and monetary cost as a default cost metric in the absence of a different cost metric being indicated by the specification 516.

In some embodiments, the execution program generator 510 monitors the optimal pathfinder module 508 for an output of an optimal path. Once the execution program generator 510 receives an optimal path output from the optimal pathfinder module 508, the execution program generator 510 generates a series of replication instructions for execution by the source and target databases to perform the replication according to the selected optimal path. In some embodiments, the execution program generator 510 outputs the series of replication instructions to the source database interface 518 and the target database interface 520 according to which database the respective instruction applies.

In some embodiments, the execution environment monitor 512 performs a goal evaluation at regular intervals to determine whether there has been a change to the network. If such a change is detected, the execution environment monitor 512 probes the environment to determine whether the chosen path remains optimal. If, for example, the execution environment monitor 512 detects a network change that affects or could benefit the currently executing path, the execution environment monitor 512 notifies the optimal pathfinder module 508 to re-evaluate the possible paths as revised due to the detected network change, and the optimal pathfinder module 508 notifies the execution program generator 510 if a path change is made.

Thus, embodiments provide improved computer processing in terms of network routing and the data flows through the network routing using the logical map-based optimizations disclosed herein. In addition, over time the replication application algorithm will continue to improve and implement additional optimizations, such as removing unnecessary work, for example by recognizing that if a field is unused, the application can stop or skip processing the field, and automatically exclude it from further processing. Also, the replication process results in a copy of the data being provided to an additional location, which means that users near the new location can run separate queries more efficiently. Alternatively, queries can then be run on multiple copies of the database, which results in an increased query capacity.

Figure 6:
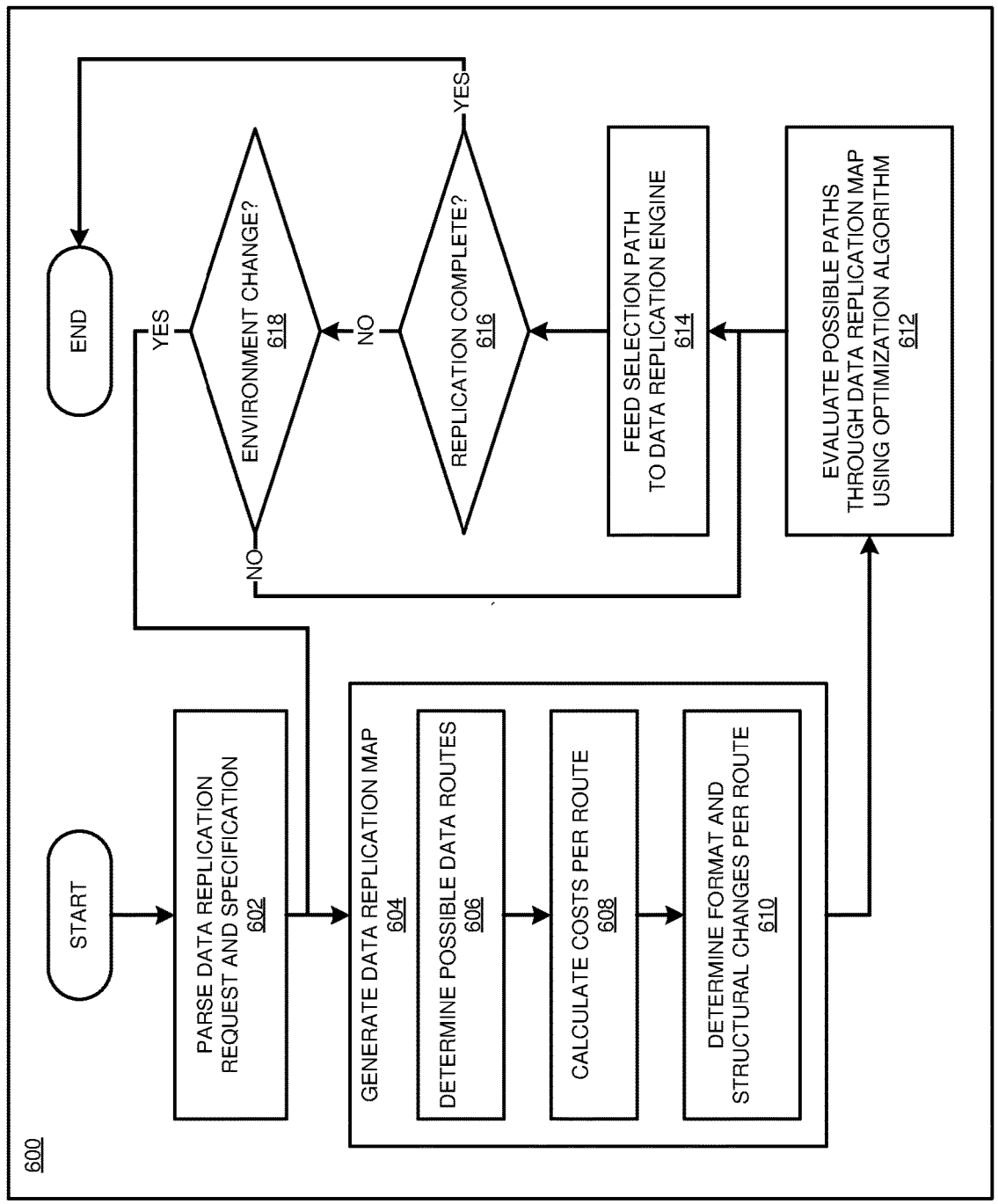
FIG. 6 depicts a flowchart of an example data replication process.

With reference to FIG. 6, this figure depicts a flowchart of an example data replication process 600. In a particular embodiment, the data replication application 402 of FIG. 4 and the intention-based configuration module 502 of FIG. 5 carry out the process 600.

In an embodiment, at block 602, the data replication application parses a data replication request and specification. The data replication application then generates a data replication logical map at block 604, which includes determining possible paths at block 606, calculating the cost per path at block 608, and determining whether any format and structural changes are also desired at block 610. Next, at block 612, the data replication application evaluates possible paths through data replication logical map using an optimization algorithm. At block 614, the data replication application feeds the selected path to a data replication engine or other such module that generates instructions for replicating data according to the selected optimal path. At blocks 616 and 618, an execution environment monitor or the like periodically determines if the replication is complete and if not, checks for network changes that affects or could benefit the currently executing path. If a change is found, the process returns to block 604 to adjust the logical map and re-check for an optimal path. Otherwise, the process continues at block 614 until the replication is complete.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer-implemented method, system or apparatus, and computer program product are provided in the illustrative embodiments for managing participation in online communities and other related features, functions, or operations. Where an embodiment or a portion thereof is described with respect to a type of device, the computer-implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method comprising:
    parsing a user-inputted declarative replication specification to derive a configuration asset, wherein the declarative replication specification includes a data conversion description based on a predefined functional description;
    generating, responsive to receiving the declarative replication specification, a logical map comprising a plurality of paths to completing a data replication process using the configuration asset derived from parsing the replication specification;
    determining, responsive to generating the logical map, an optimal path to completing the data replication process by searching the plurality of paths of the logical map using a cost-directed search algorithm to find the optimal path from among the plurality of paths;
    performing, responsive to finding the optimal path, a series of data replication operations for replicating source data on a target database;
    detecting, during a runtime of the data replication process, a predetermined change to a runtime environment of the data replication process; and
    determining, responsive to detecting the predetermined change, a revised optimal path for performing the data replication process in the changed runtime environment.

2. The computer-implemented method of claim 1, further comprising:
    parsing the replication specification to retrieve a connection asset,
    wherein the generating of the logical map includes using the connection asset as a constraint for identifying paths.

3. The computer-implemented method of claim 1, wherein the generating of the logical map includes generating a path that represents an option for routing data from the source database to the target database.

4. The computer-implemented method of claim 1, wherein the determining of the optimal path comprises using a time cost as a cost metric for the cost-directed search algorithm.

5. The computer-implemented method of claim 1, wherein the determining of the optimal path comprises using a monetary cost as a cost metric for the cost-directed search algorithm.

6. The computer-implemented method of claim 1, wherein the cost-directed search algorithm comprises an A-star search algorithm.

7. The computer-implemented method of claim 1, wherein the declarative replication specification includes an indication that the source database is a first type of database, and the target database is a second type of database different from the first type of database.

8. The computer-implemented method of claim 1, wherein the generating of the logical map includes identifying the data conversion description by recognizing the predefined functional description and generating a path that represents an option of converting data according to the data conversion description.

9. The computer-implemented method of claim 1, wherein the generating of the logical map includes generating a path that represents an option of transforming data as part of the replication process to conform to a difference in a structure of the target database compared to the source database.

10. A computer usable program product for data replication, the computer program product comprising one or more computer readable storage media, and program instructions collectively stored on the one or more computer readable storage media, the program instructions executable by a processor to cause the processor to perform operations comprising:
    parsing a user-inputted declarative replication specification to derive a configuration asset, wherein the declarative replication specification includes a data conversion description based on a predefined functional description;
    generating, responsive to receiving the declarative replication specification, a logical map comprising a plurality of paths to completing a data replication process using the configuration asset derived from parsing the replication specification;
    determining, responsive to generating the logical map, an optimal path to completing the data replication process by searching the plurality of paths of the logical map using a cost-directed search algorithm to find the optimal path from among the plurality of paths; performing, responsive to finding the optimal path, a series of data replication operations for replicating source data on a target database;
    detecting, during a runtime of the data replication process, a predetermined change to a runtime environment of the data replication process; and
    determining, responsive to detecting the predetermined change, a revised optimal path for performing the data replication process in the changed runtime environment.

11. The computer usable program product of claim 10, wherein the stored program instructions are stored in a computer readable storage device in a data processing system, and wherein the stored program instructions are transferred over a network from a remote data processing system.

12. The computer usable program product of claim 10, wherein the stored program instructions are stored in a computer readable storage device in a server data processing system, and wherein the stored program instructions are downloaded over a network to a remote data processing system for use in a computer readable storage device associated with the remote data processing system, further comprising:
    program instructions to meter use of the computer usable code associated with the request; and
    program instructions to generate an invoice based on the metered use.

13. The computer usable program product of claim 10, further comprising:
    parsing the replication specification to retrieve a connection asset,
    wherein the generating of the logical map includes using the connection asset as a constraint for identifying paths.

14. The computer usable program product of claim 10, wherein the generating of the logical map includes generating a path that represents an option for routing data from the source database to the target database.

15. The computer usable program product of claim 10, wherein the determining of the optimal path comprises using a time cost as a cost metric for the cost-directed search algorithm.

16. The computer usable program product of claim 10, wherein the determining of the optimal path comprises using a monetary cost as a cost metric for the cost-directed search algorithm.

17. A computer system comprising a processor and one or more computer readable storage media, and program instructions collectively stored on the one or more computer readable storage media, the program instructions executable by the processor to cause the processor to perform process comprising:

parsing a user-inputted declarative replication specification to derive a configuration asset, wherein the declarative replication specification includes a data conversion description based on a predefined functional description;

generating, responsive to receiving the declarative replication specification, a logical map comprising a plurality of paths to completing a data replication process using the configuration asset derived from parsing the replication specification;

determining, responsive to generating the logical map, an optimal path to completing the data replication process by searching the plurality of paths of the logical map using a cost-directed search algorithm to find the optimal path from among the plurality of paths; performing, responsive to finding the optimal path, a series of data replication operations for replicating source data on a target database;

detecting, during a runtime of the data replication process, a predetermined change to a runtime environment of the data replication process; and determining, responsive to detecting the predetermined change, a revised optimal path for performing the data replication process in the changed runtime environment.

18. The computer system of claim 17, further comprising:
parsing the replication specification to retrieve a connection asset,
wherein the generating of the logical map includes using the connection asset as a constraint for identifying paths.

19. The computer system of claim 17, wherein the generating of the logical map includes generating a path that represents an option for routing data from the source database to the target database.

20. The computer system of claim 17, wherein the determining of the optimal path comprises using a time cost as a cost metric for the cost-directed search algorithm.

* * * * *